Nov 2, 1937.   M. GUÉRIN ET AL   2,098,002
DISPLAY LIGHTING CIRCUITS
Filed Jan. 12, 1933    5 Sheets-Sheet 1

Marcel Guérin and
Paul Breton
Inventors
by Barnett and Barnett
Attorneys

Nov 2, 1937.  M. GUÉRIN ET AL  2,098,002
DISPLAY LIGHTING CIRCUITS
Filed Jan. 12, 1933  5 Sheets—Sheet 2

Marcel Guérin and
Paul Breton
Inventors
by Barnett and Barnett
Attorneys

Nov 2, 1937.   M. GUÉRIN ET AL   2,098,002
DISPLAY LIGHTING CIRCUITS
Filed Jan. 12, 1933   5 Sheets-Sheet 4
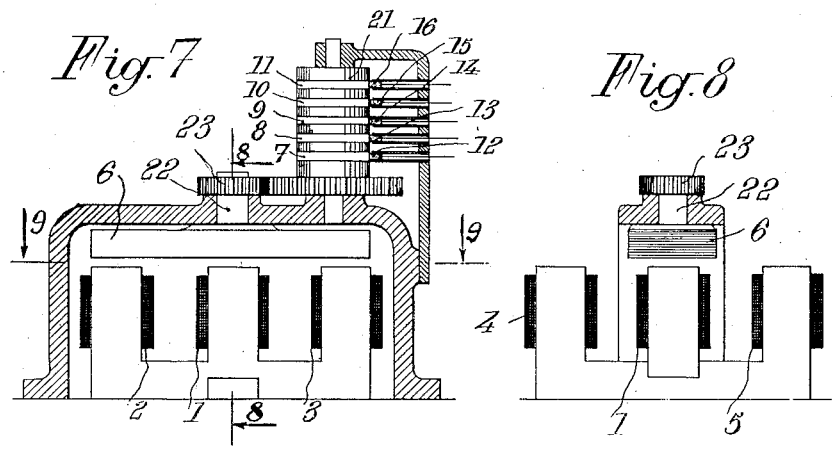
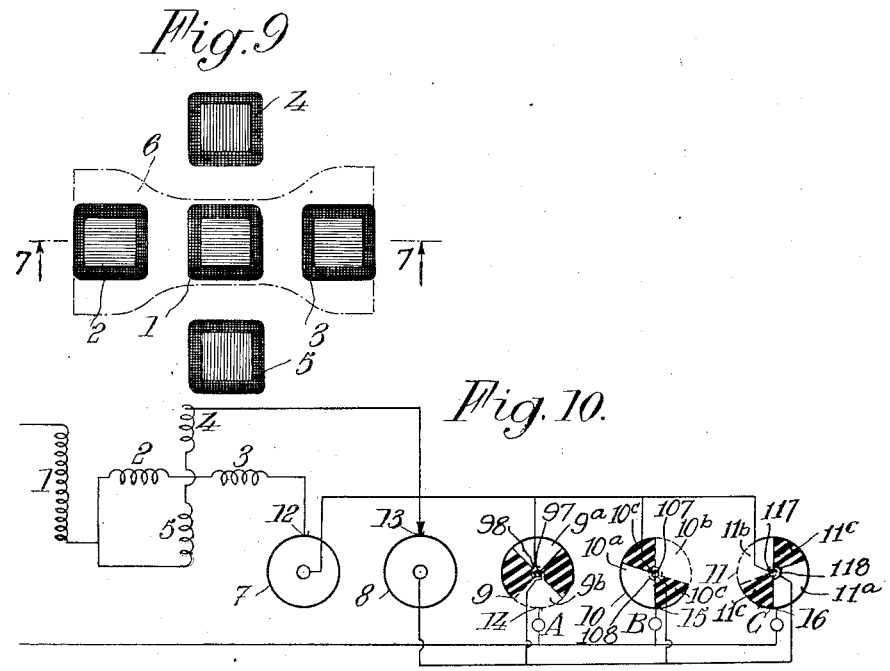
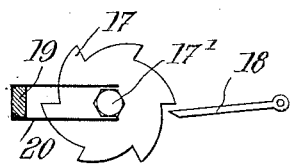

Marcel Guérin and
Paul Breton
Inventors
by Barnett and Barnett
Attorneys

Patented Nov. 2, 1937

2,098,002

UNITED STATES PATENT OFFICE 2,098,002

DISPLAY LIGHTING CIRCUITS

Marcel Guérin, Paris, and Paul Breton, Bellevue, France

Application January 12, 1933, Serial No. 651,344
In Belgium January 15, 1932

4 Claims. (Cl. 177—346)

The present invention relates to display lighting circuits wherein groups of lamps are intermittently lighted and extinguished.

One of the objects of the invention is to provide a method and apparatus for intermittently illuminating series or banks of lamps by means of a transformer wherein the primary and secondary are rotatable relatively to one another.

Another object is to provide a transformer assembly for a display lighting circuit wherein a stationary primary and secondary are fitted with a rotating armature operative to vary the inductive effect of the primary on the secondary.

A further object is to provide a transformer assembly wherein an auxiliary transformer yielding a constant voltage is coupled in various ways to a main transformer assembly including a primary and secondary of one of the types referred to above.

Still further objects will appear in the course of the detailed description now to be given with reference to the accompanying drawings, in which:

Fig. 7 is a section taken on line 7—7 of Fig. 9 to be described and showing a form of transformer wherein the primary and secondary are stationary, variations in flux being produced by a rotating armature;

Fig. 8 is a section taken on line 8—8 of Fig. 7;

Fig. 9 is a section taken on line 9—9 of Fig. 7;

Fig. 10 illustrates, diagrammatically, different forms of segments mounted on the distributor represented in Fig. 7;

Fig. 11 shows a special type of distributor control;

Figs. 12 to 15 inclusive are wiring diagrams showing various methods of coupling an auxiliary transformer to any of the transformers shown in the preceding figures.

Figure 1:
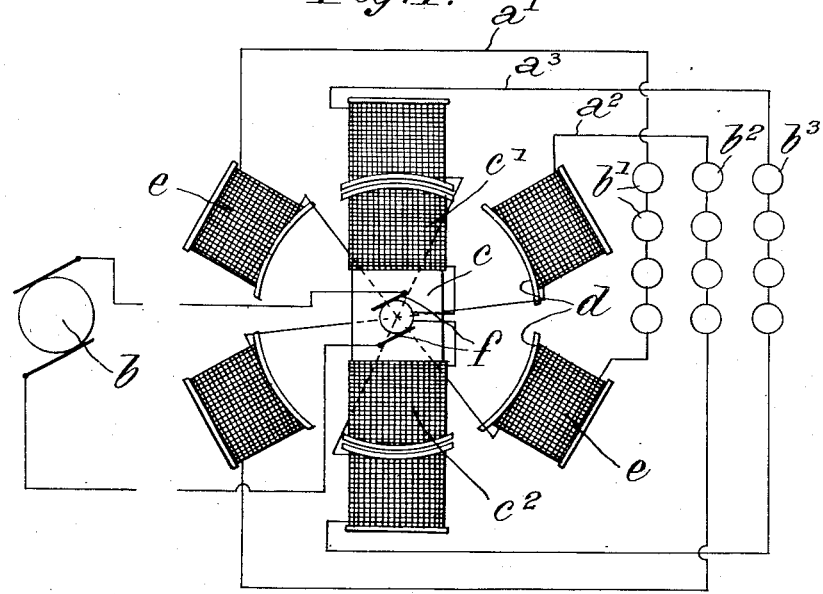
Fig. 1 represents, diagrammatically, one illustrative embodiment of the invention.

Referring to Fig. 1 of the drawings, there is shown a series of lighting circuits $a^1$, $a^2$, $a^3$ feeding three banks of lamps $b^1$, $b^2$, $b^3$ which may be of any desired combination of colors such as blue, green and red. Each lighting circuit is coupled to a pair of secondary coils $d$ positioned at 180° to one another, current being induced in the various secondaries by the rotation of a pair of primaries $c^1$, $c^2$, rotatably mounted inside the secondaries and receiving current from an alternator $b$ through the intermediary of appropriate brushes or rings $f$. Core $c$, supporting the primary windings, is driven by an appropriate motor (not shown).

It will be readily seen that, as the primary coils rotate successively past the various secondary windings, they will induce intermittent currents in circuits $a^1$, $a^2$, and $a^3$. Preferably, secondaries $d$ are provided with lateral extensions (see Fig. 2) and the periphery of the primaries is correspondingly spread so that, during rotation, the primary overlaps a pair of adjacent secondaries. The various groups of lamps are thus gradually lighted and extinguished and always receive a certain predetermined minimum amount of current.

Figure 4:
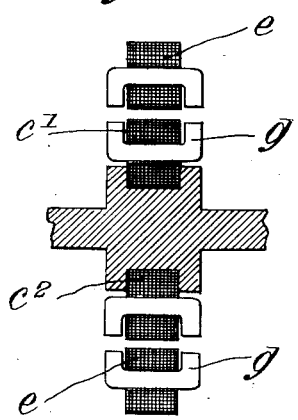
Fig. 4 represents, in section, a modified form of transformer adapted to replace those shown in Figs. 1 to 3 inclusive.
Figure 2:
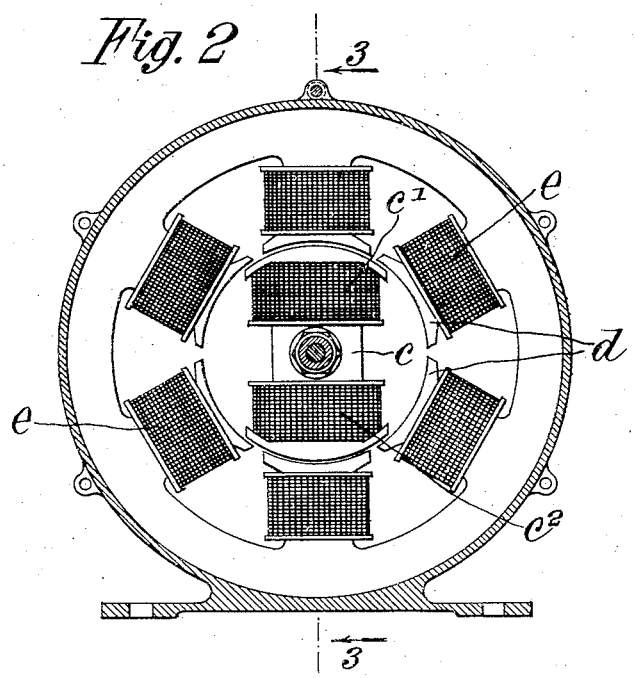
Fig. 2 is a section taken on line 2—2 of Fig. 3 (to be described) showing a transformer assembly adapted to be used in circuits of the type illustrated in Fig. 1.
Figure 3:
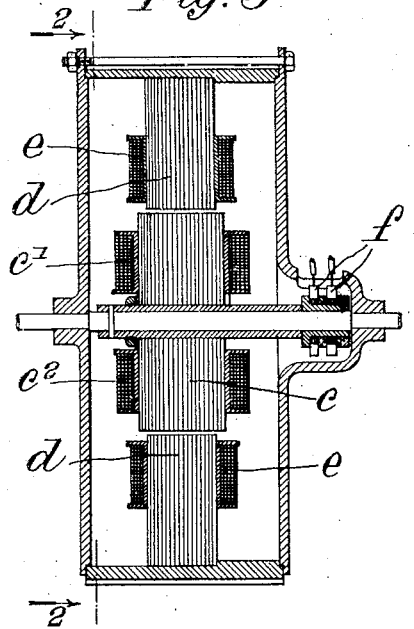
Fig. 3 is a section taken on line 3—3 of Fig. 2.

The transformer shown in Fig. 4 differs from those represented in Figs. 1 to 3 inclusive only in the position of the primary and secondary coils which are here placed with their longitudinal axes in horizontal position instead of in the vertical, cores $g$ being U-shaped and having their extremities directed toward one another. As will be obvious to those skilled in the art, the magnetic circuit flowing through the opposed U-shaped cores will vary through maxima and minima substantially in the same way as for the transformers already described.

Figure 5:
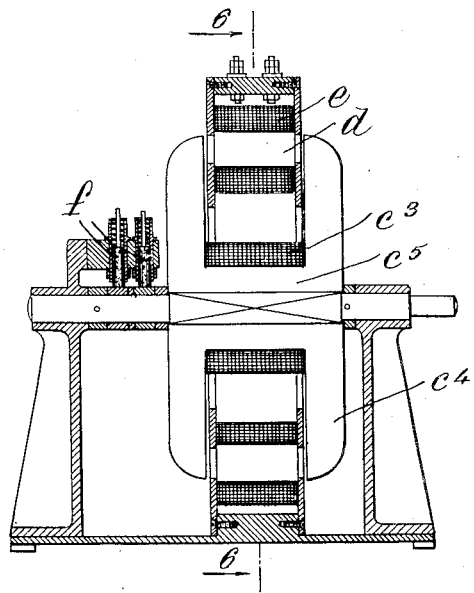
Fig. 5 is a section taken on line 5—5 of Fig. 6 (to be described) and shows still another form of transformer.
Figure 6:
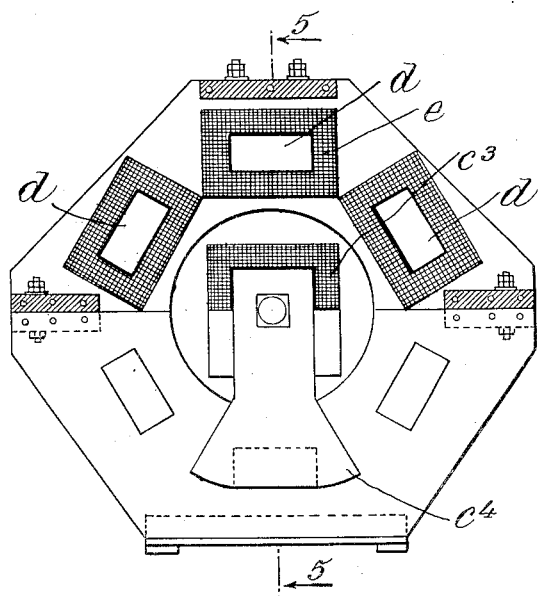
Fig. 6 is an elevation, partially in section, of the transformer represented in Fig. 5 the section being taken on line 6—6 of the latter.

In the transformer represented in Figs. 5 and 6, the primary is composed of a central winding $c^3$ mounted on a rotatable core $c^5$ provided with pairs of lateral, radial arms $c^4$, while the secondary windings $e$ are supported on a series of horizontal cores $d$. As will at once be evident from an inspection of Fig. 5, rotation of the primary coil will cause arm $c^4$ to successively sweep past the ends of cores $d$ and so vary the magnetic field by increasing and decreasing the air gap.

In the form of transformer shown in Figs. 7 to 9, the primary and secondary coils are maintained stationary and the effect of the former on the latter is varied by means of a rotating armature interposed therebetween and acting to vary the section of the air gap. The primary winding $l$ is placed centrally with relation to two pairs of secondary coils 2—3 and 4—5 lying at 90° to one another. The magnetic field is modified by a rotatably mounted armature 6 composed of laminated plates and acting to open and close the air gap between the cores of the primary and secondary coils. Armature 6 is driven by a shaft 22 carrying a pinion 23 and is coupled to a distributing drum by means of a second pinion in mesh with element 23. The distributor 21 includes a plurality of rings 7, 8, 9, 10, 11 insulated from one another and delivering current to a series of brushes 12, 13, 14, 15, 16 connected to lighting circuits of the type $a^1$, $a^2$, $a^3$ shown in Fig. 1. By varying the ratio between the teeth of the pinions, the ratio between the number of turns of element 6 and the number of successive illuminations and extinctions of the various lamp circuits may be varied at will.

Fig. 10 illustrates how this latter ratio may be given a predetermined value and how the time during which the various lamp groups remain in action may be further modified. The structures numbered 1, 2, 3, 4, 5 represent a transformer assembly either of the type shown in Fig. 1 or Fig. 7. Rings 7 and 8 of the distributor are conducting over their whole periphery and receive current from two secondary coils via brushes 12 and 13. Elements 9, 10 and 11, on the contrary, include each two conducting sectors (9a and 9b for ring 9, 10a and 10b for ring 10, 11a and 11b for ring 11) and two insulating sectors (9c for ring 9, 10c for ring 10, and 11c for ring 11. The two conducting sectors of each of the rings are connected respectively to rings 7 and 8. For instance, sector 9a is connected through its hub 97 to ring 7, and sector 9b through its hub 98 to ring 8; sector 10a is connected through part 107 with ring 7 and sector 10b through hub 108 to ring 8; sector 11a is connected through part 118 with ring 8 and sector 118 through part 119 with ring 8. This system distributes current from one or the other of the secondary circuits forming part of the lighting circuit containing banks of lamps A, B, C through the intermediary of brushes 14, 15 and 16. By properly orienting the conducting portions of rings 9, 10 and 11, the time during which each bank of lamps is illuminated may be varied at will. If the ratio between the speed of rotation of pole or armature 6 and that of distributing cylinder 21 be chosen as 1 to 3, the latter cylinder will rotate once for three rotations of pole 6. Pole 6 will, therefore, have caused six illuminations and six extinctions to take place during this time while distributor 21 will have illuminated each bank of lamps twice. If the number of lighting circuits exceeds three, it is only necessary to provide as many brushes of the type of 14, 15 and 16 as there are circuits, the ratio between the speed of rotation of elements 6 and 21 being chosen as 1 to $n$, where $n$ represents the number of lighting circuits.

Fig. 11 shows a distributor control which may be used to replace the one shown in Figure 7 and consists of a ratchet wheel 17 having twice as many teeth as there are circuits to be supplied. A finger or arm 18 driven from shaft 22 in Figure 7 rotates wheel 17 through the angle between a pair of adjacent teeth for each rotation of pole piece 6, thus causing, in the same way as for the assembly in Figure 7, current to flow from one of the secondary circuits into a corresponding bank of lamps. A pair of parallel springs 19 and 20 embracing a hexagonal nut or cam $17^1$ serves to arrest the distributor after each angular displacement.

Referring now to Figures 12 to 15 inclusive there is shown a series of circuits wherein transformers of the type shown in Figures 1 and 7 co-act with an auxiliary transformer functioning to add a constant voltage of invariable phase vectorially to the electromotive forces arising in secondaries $e$ (or 2—3 and 4—5).

With this arrangement, even when no current is fed to a bank of lamps by the main transformer, a small amount of current still flows therethrough, owing to the constant voltage fed by the auxiliary transformer. This is done to avoid sparking, as might occur if the lamps were fully switched off after every illumination.

Figure 12:
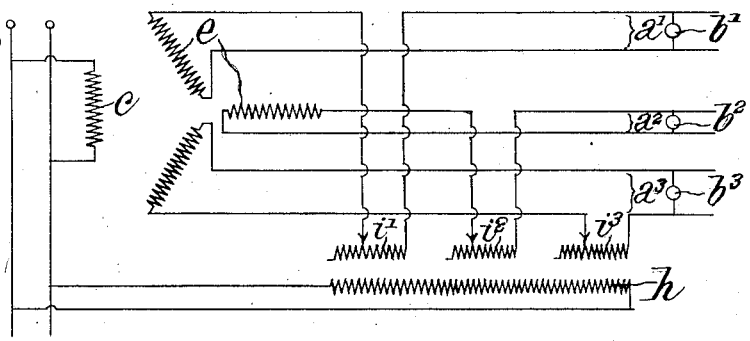

In the assembly shown in Figure 12, the auxiliary transformer consists of a primary $h$ mounted in the same circuit as rotating primary winding $c$ and inducing current in a series of secondaries $i^1$, $i^2$, $i^3$ connected in series with each of the lamp circuits. The amount of current taken from these latter secondaries may be varied by means of appropriate sliding contacts impedances or equivalent devices.

Figure 13:
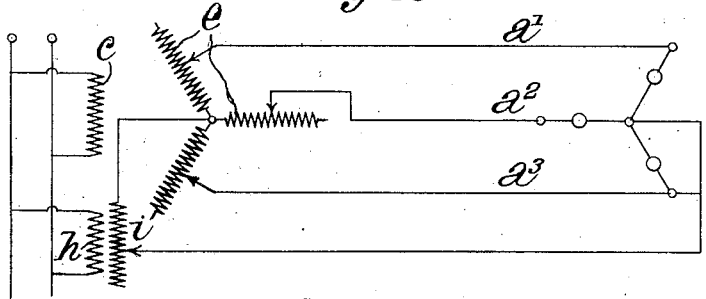

In Figure 13, the secondary windings $e$ are connected in star relation with a single secondary $i$ of the fixed transformer mounted in parallel across the neutral points of the assembly and current is induced therein by primary $h$ connected in circuit with primary winding $c$ in the manner shown in Figure 12. The amount of current taken from secondary $i$ may be made variable and this may be done, equally, for secondary windings $e$.

Figure 14:
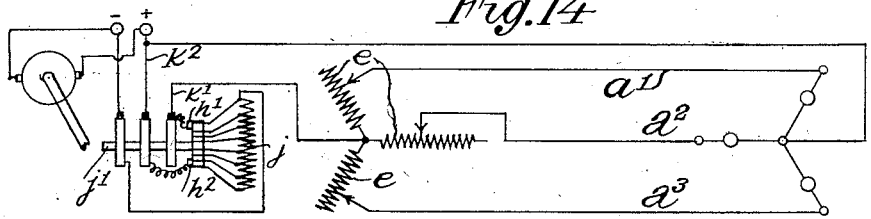

In the embodiment of Fig. 14, the primary winding $j$ of the transformer, mounted on a rotary shaft $j^1$, is provided with contacts $h^1$ and $h^2$ connected with respective rings also mounted on said shaft and cooperating with brushes connected with wires $k^1$ and $k^2$, respectively. The third ring cooperates with a brush connected to one of the terminals of the source of current, said last mentioned ring being further connected with one end of the primary winding $j$.

As it results from the connections shown by the drawings, the portion of winding $j$ between contacts $h^1$ and $h^2$ constitutes an auto-transformer which supplies the desired constant voltage to the secondary circuits $a^1$, $a^2$ and $a^3$.

Figure 15:
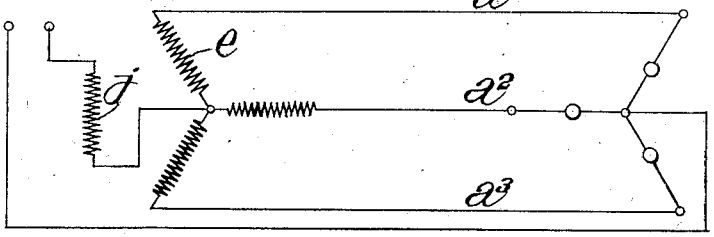

The assembly shown in Figure 14 may be further simplified by using the counter-electromotive force derived from primary $j$ as a fixed source of electromotive force, the latter being connected in series as shown in Fig. 15 with the neutral points of the rotating transformer, while the corresponding neutral points of the lighting circuit are connected to the other poles of the current source.

The invention is not to be taken as limited to the structures shown in any particular figure. Thus, the transformer shown in Figures 1, 4, 5 and 7 may be used interchangeably with any of the circuits represented in Figures 1, 10 or 6 to 9. Similarly, distributor 21 may be used interchangeably with the one shown in Figure 5. Finally, any one of the circuits represented in Figures 12 to 15 may replace one another in whole or in part.

In practice, the effect of a rotating transformer may be obtained by utilizing a polyphase motor wherein the stator and rotor have a different number of phases, the primary and secondary windings being composed of (1) a monophase stator coacting with a triphase rotor or (2) a triphase stator coacting with a monophase rotor.

What we claim is:—

1. A device of the type described, which comprises, in combination, a plurality of electric circuits, electric lamps in said circuits respectively, a plurality of secondary windings connected to said circuits respectively, a source of alternating current, a primary winding connected to the poles of said source adapted to induce current in said secondary windings, rotary means for inductively coupling said primary winding with said secondary windings, successively, whereby the luminous intensities of the respective lamps of said circuits are gradually increased and then decreased, successively, and an auxiliary transformer system having a primary element connected to the poles of said source and at least one secondary part connected with the circuit of one of said secondary windings, for adding a constant electromotive force to the varying electromotive force in said circuit.

2. A device of the type described, which comprises, in combination, a plurality of electric circuits, electric lamps in said circuits respectively connected together in star relation, a plurality of secondary windings connected to said circuits respectively and interconnected together in star relation, a primary winding adapted to induce current in said secondary windings, rotary means for inductively coupling said primary winding with said secondary windings, successively, whereby the luminous intensities of the respective lamps of said circuits are gradually increased and then decreased, successively, and an auxiliary transformer system having its primary connected in parallel with said primary winding and its secondary connected in shunt across the neutral points of said secondary windings and their lamp circuits, so as to add a fixed electromotive force to the varying electromotive force produced in said circuits by the action of said primary winding on said secondary windings.

3. A device of the type described which comprises, in combination, a plurality of electric circuits, electric lamps in said circuits respectively connected together in star relation, a plurality of secondary windings included in said electric circuits respectively and interconnected together in star arrangement, a primary winding adapted to induce current in said secondary windings, rotary means for inductively coupling said primary winding with said secondary windings, successively, whereby the luminous intensities of the respective lamps of said circuits are gradually increased and then decreased, successively, and means for connecting an intermediate portion of said primary winding in shunt across the neutral points of the star related secondary windings and their lamp circuits, so that said primary winding may work as an auto-transformer adapted to add a fixed electromotive force to the varying electromotive force produced in said circuits by the direct inductive action of said primary winding on said secondary windings.

4. A device of the type described which comprises, in combination, a plurality of electric circuits, electric lamps in said circuits, respectively connected together in star arrangement, a plurality of secondary windings included in said electric circuits respectively and interconnected together in star relation, a primary winding adapted to induce current in said secondary windings, rotary means for inductively coupling said primary winding with said secondary windings, successively, whereby the luminous intensities of the respective lamps of said circuits are gradually increased and then decreased, successively, and means for connecting said primary coil to its source of primary current across the neutral points of said secondary windings and their respective lamp circuits, so as to make use of the counter-electromotive force derived from said primary winding as of a constant electromotive force added to the varying electromotive forces directly produced by the inductive action of said primary winding on said secondary windings.

MARCEL GUÉRIN.
PAUL BRETON.